United States Patent [19]

Bauer et al.

[11] Patent Number: 5,566,362
[45] Date of Patent: Oct. 15, 1996

[54] WIRELESS VOICE TRANSMISSION SYSTEM

[75] Inventors: Alfred Bauer, Parma; Joseph A. Birli, South Euclid; Jack J. Becker; Greg L. Skillicorn, both of Solon; Jose L. Ramos, Lorain, all of Ohio

[73] Assignee: Audiopack Sound Systems, Inc., Cleveland, Ohio

[21] Appl. No.: 237,036

[22] Filed: May 3, 1994

[51] Int. Cl.$^6$ .................................. H04B 1/38
[52] U.S. Cl. .................. 455/90; 455/89; 455/346
[58] Field of Search .................. 455/66, 74, 89, 455/90, 346, 348, 349, 62, 128, 41, 100, 88, 11.1, 15, 20; 379/175; 381/168, 169, 187

[56] References Cited

U.S. PATENT DOCUMENTS

| | | | |
|---|---|---|---|
| 3,559,209 | 2/1971 | Vail | 455/89 |
| 3,845,389 | 10/1974 | Phillips et al. | 455/100 |
| 3,889,190 | 6/1975 | Palmer | 455/100 |
| 3,916,312 | 10/1975 | Campbell | 455/100 |
| 4,119,800 | 10/1978 | Girardi | 455/79 |
| 4,334,315 | 6/1982 | Ono et al. | 455/89 |
| 4,392,243 | 7/1983 | Ohhashi et al. | 455/74 |
| 4,491,699 | 1/1985 | Walker | 455/89 |
| 4,885,796 | 12/1989 | Loftus et al. | 455/89 |
| 4,980,926 | 12/1990 | Noetzel | 455/41 |
| 5,060,308 | 10/1991 | Bieback | 359/154 |
| 5,101,504 | 3/1992 | Lenz | 455/90 |
| 5,142,700 | 8/1992 | Reed | 455/90 |
| 5,224,473 | 7/1993 | Bloomfield | 381/168 |
| 5,404,577 | 4/1995 | Zuckerman et al. | 455/90 |

FOREIGN PATENT DOCUMENTS 0052122 9/1983 Japan ..................... 455/89

Primary Examiner—Reinhard J. Eisenzopf
Assistant Examiner—Marsha D. Banks-Harold
Attorney, Agent, or Firm—Calfee Halter & Griswold

[57] ABSTRACT

A voice transmission system for a protective face mask is provided, comprising a voice transmitter attached to an external portion of the face mask, a radio receiver, and a two-way radio. The voice transmitter is attached to an external portion of the face mask and transmits the voice of a user of the face mask via a short range radio signal. The radio receiver receives the short range radio signal output by the voice transmitter, processes the short range radio signal, and outputs an audio output signal. The two-way radio (i) receives the audio output signal from the radio receiver, amplifies the audio output signal, and transmits the amplified audio output signal to a remotely located receiver, in a transmitting mode, and (ii) receives a broadcast signal from a remotely located transmitter in a receiving mode. A voice actuated switch switches the two way radio between receiving and transmitting modes. The transmitter transmits the short range radio signal in the ultra high frequency (UHF) radio range, and the receiver downconverts the short range radio signal from the UHF radio range to the audio frequency range.

16 Claims, 3 Drawing Sheets

WIRELESS VOICE TRANSMISSION SYSTEM

FIELD OF THE INVENTION

The present invention relates generally to voice transmission systems for protective face masks and more particularly to a removable voice transmission system for a protective face mask which permits radio communication with a remote location.

BACKGROUND OF THE INVENTION

Protective face masks or respirators for the human face are well known. Persons wearing such respirators often have a need to communicate with one another, particularly in emergency situations. Such emergency situations include fires involving firefighters for whom effective communications with each other and with a command center are critical. Other examples of such emergency situations include military operations wherein military personnel must also communicate with each other and with a central command center.

Because users of these respirators, such as firefighters or military personnel, typically work in hostile environments, it is imperative that the mask remain on the user at all times while the user remains in that environment. Any voice communications systems associated with the mask must also not substantially interfere with the movement of the user. Thus, it is desirable when designing voice communications systems for face masks to eliminate unnecessary wires which might otherwise become entangled with the arms of the user or a stationary object and cause the mask to be pulled away from the face of the user.

A wireless communications apparatus for use in hazardous environments is shown, for example, in U.S. Pat. No. 4,885,796 to Loftus et al. The Loftus apparatus includes a face mask which covers the eyes, nose and mouth of the user. A relatively low power transmitter is located entirely within the mask for transmitting a short range signal carrying a communication from the user. A receiver carried on the user's person is tuned to receive the signal of the low powered transmitter and to provide an audio output. A relatively higher powered transceiver is also carried on the user's person. A voice actuated switch is responsive to the output of the receiver to switch the transceiver from a receiving mode to a transmitting mode. A cable connects the voice actuated switch and the transceiver to switch the transceiver between its receiving and transmitting operational modes, and to supply the output of the receiver as the audio input to the transceiver so that the user may communicate with remote receivers tuned to the frequency of the transceiver.

Positioning the transmitter entirely inside the mask as in the Loftus device, however, is less advantageous than locating the transmitter on the outside of the mask. For example, the addition of any foreign objects inside the mask poses a potential safety concern, as well as a comfort inconvenience for the user. Moreover, transmitters located on the inside of the mask are not as easily removable and adaptable to other masks. Ease of removability is an important feature because the mask is typically cleaned when the transmitter is detached from the mask. In addition, by placing the transmitter on the inside of the mask, the transmitter may not be removed while the user is wearing the mask.

Thus it is desirable to place the transmitter on the outside of the mask, to eliminate the disadvantages cited above. However, positioning the transmitter on the outside of the mask provides a technical challenge as the user's voice is further removed from the transmitter and therefore more difficult to detect and process. Accordingly, it is an object of the present invention to provide a wireless voice transmission system for a face mask for use in hostile environments, wherein the face mask is provided with a wireless transmitter mounted to and easily removable from the outside of the mask. It is a further object to provide a wireless two-way voice communications system which may be used in conjunction with or without a protective face mask.

SUMMARY OF THE INVENTION

A voice transmission system is provided for use with a protective face mask, comprising a transmitter module attachable to the outside of the mask, a receiver, and a two-way radio connected to the receiver by means of an interconnect cable. The two-way radio is provided with an antenna to facilitate audio signal transmission and reception to and from a remote location. The voice transmission system permits two-way communications between a user and the remote location.

The mask is provided with an airtight diaphragm located behind the transmitter module. The diaphragm prevents smoke and noxious gases from entering the interior of the face mask yet permits the user's voice to pass therethrough to enable the user to communicate locally with the outside environment. The diaphragm is located on an extension of the face mask which provides a passageway to direct the user's voice toward the outside environment. The transmitter module is removably attachable to the outside of the face mask at the location of the extension.

The transmitter module includes a housing which encloses therein a transducer, a circuit board, and a pair of batteries for supplying power to the transducer and the circuit board. The housing is compartmentalized to isolate these items and to better secure them within the housing. The housing includes a back cover which may be removed to access the transducer, the circuit board and the batteries.

A magnetically actuatable reed switch is contained within the housing for switching power to the transmitter module. A magnet mounted on the outside of the housing and slidable with respect to the reed switch controls the operation of the reed switch to switch the transmitter module on and off.

The voice transmission system operates in either a transmit mode or a receive mode. A voice actuated switch is provided to switch the two-way radio between these modes of operation. When the user speaks, the voice actuated switch is activated to switch the two-way radio into a transmit mode. In the absence of the user's voice, the voice actuated switch is deactivated, switching the two-way radio into the receive mode.

In the transmit mode, the transmitter module picks up the user's voice after it passes through the diaphragm, processes the received signal, and broadcasts a short range radio signal in the ultra high frequency (UHF) radio range. The receiver receives the short range radio signal output by the transmitter module and processes the signal by downconverting the signal from the ultra high frequency (UHF) radio range to the audio range. The receiver is provided with an amplifier/speaker assembly to amplify this resulting audio signal and provide local broadcast of the user's voice. The audio signal is also used as an input to the two-way radio via the interconnect cable. The two-way radio amplifies the audio input and transmits the amplified signal to a remotely located receiver by means of its antenna. The remotely located receiver amplifies the received signal, enabling the user to effectively communicate with the remote location.

In the receive mode of operation of the voice transmission system, a remotely located transmitter transmits a signal to the two-way radio which picks up the signal on its antenna and passes the signal on to the receiver via the interconnect cable. The receiver amplifies the audio signal to provide local broadcast of the received communication.

DETAILED DESCRIPTION OF THE PREFERRED EMBODIMENT

Figure 1A:
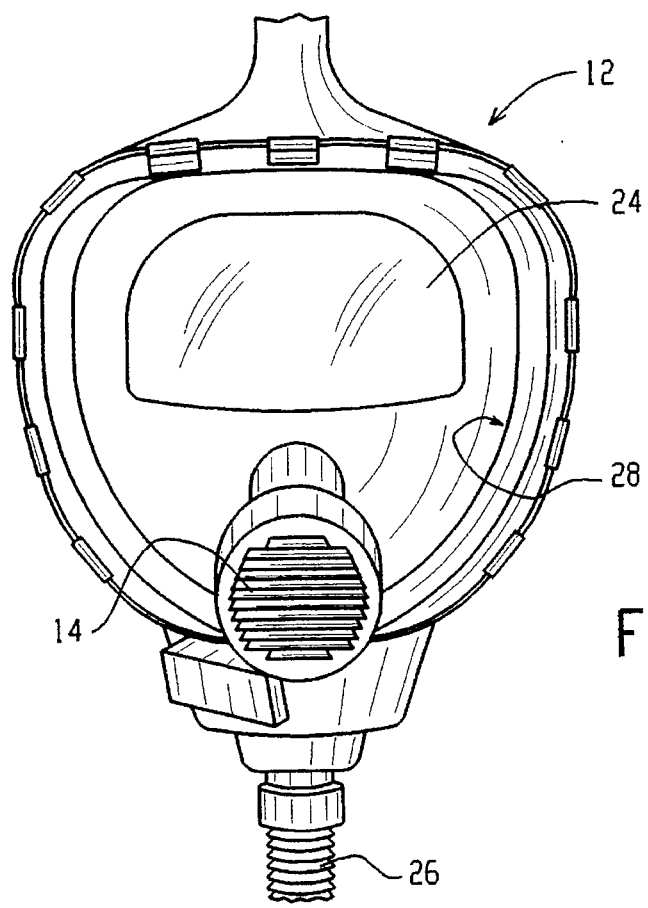
FIGS. 1A and 1B, taken together, are a perspective view of the individual components of a wireless voice transmission system constructed according to the principles of the present invention.
Figure 1B:
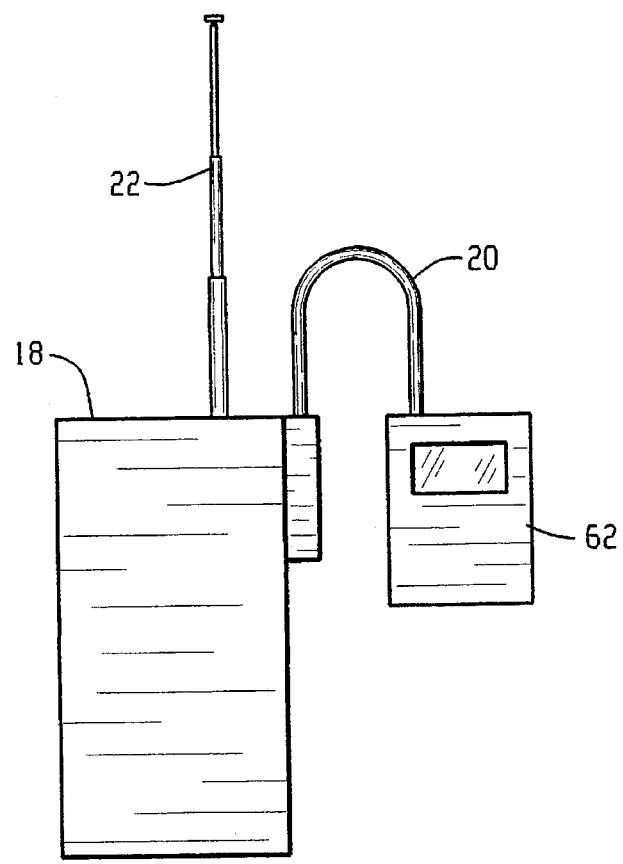

A voice transmission system constructed according to the principles of the present invention is shown in FIGS. 1A and 1B. The voice transmission system includes a mask 12, a transmitter module 14 attached to the outside of the mask, a receiver 16, and a two-way radio 18 connected to the receiver 16 by means of an interconnect cable 20. The two-way radio 18 is provided with an antenna 22. The receiver and two-way radio are typically worn at belt level by the user, although other wearing locations on the user are contemplated, such as about the shoulder area of the user.

The mask 12 is provided with a transparent viewing shield 24 through which the user may see. The mask is also provided with an air tube 26 which connects a supply of fresh oxygen (not shown) to the mask. A resilient seal 28 surrounds the mask 12 which seats against the face of the user to isolate smoke or noxious gases from the respiratory system of the user.

Figure 2:
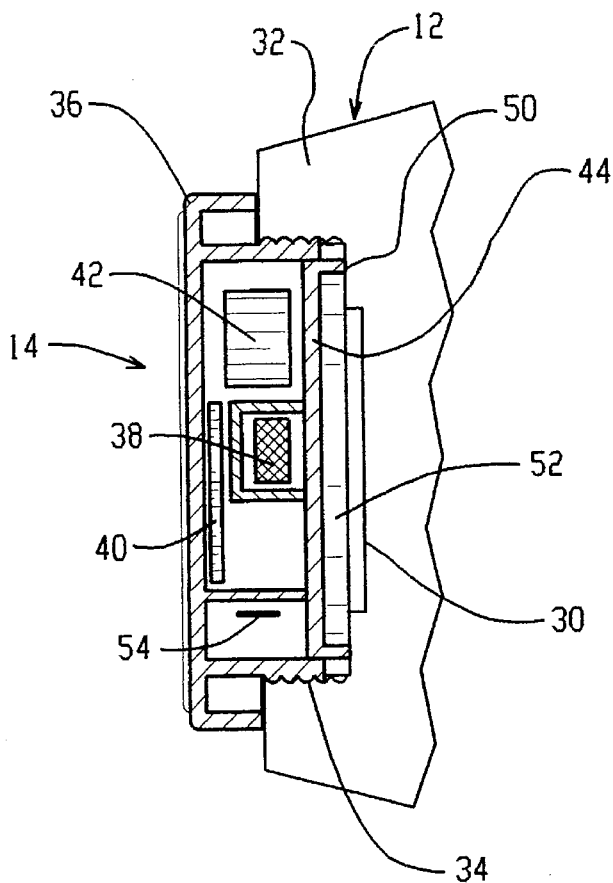
FIG. 2 is a side sectional view of the transmitter/face mask assembly of the voice transmission system of FIG. 1.

An airtight diaphragm 30 is located behind the transmitter module 14 (see FIG. 2). The diaphragm prevents smoke and noxious gases from entering the interior of the face mask yet permits the user's voice to pass therethrough to enable the user to communicate locally with the outside environment. The diaphragm is located on an extension 32 of the face mask 12 which provides a passageway to direct the user's voice toward the outside environment.

The transmitter module 14 attaches to the outside of the face mask 12 at the location of the extension 32. As shown in FIG. 2, the extension 32 is provided with threads or ridges 34 on the portion thereof which forms the passageway for the user's voice. The transmitter module 14 fits snugly within the passageway and is secured to the face mask using any number of known techniques. Some of these known techniques include spring loaded compression, screw-in, pop-in, snap-on and hinged attachment. Examples of some of these manners of attachment are shown in commonly owned U.S. Pat. No. 5,138,666 and U.S. application Ser. Nos. 07/792,804 and 08/038,456, the text of each of which is hereby incorporated as if fully set forth herein. These types of attachment techniques permit the transmitter module 14 to be easily attached to and detached from the face mask extension while the mask remains on the face of the user. Moreover, these attachment techniques permit the voice transmitter module to be removably detachable from the face mask without removing or altering the voice diaphragm.

The transmitter module 14 includes a housing 36 which encloses therein a transducer 38 (e.g. a microphone), a circuit board 40, and a pair of batteries 42 for supplying power to the transducer and the circuit board. The housing is compartmentalized to isolate the transducer 38, the circuit board 40, and the batteries 42 from each other and to better secure these items within the housing. The housing is preferably made of a thermoplastic material which may be manufactured, for example, by an injection molding process. The batteries in the preferred embodiment each provide a potential of three volts.

Figure 3:
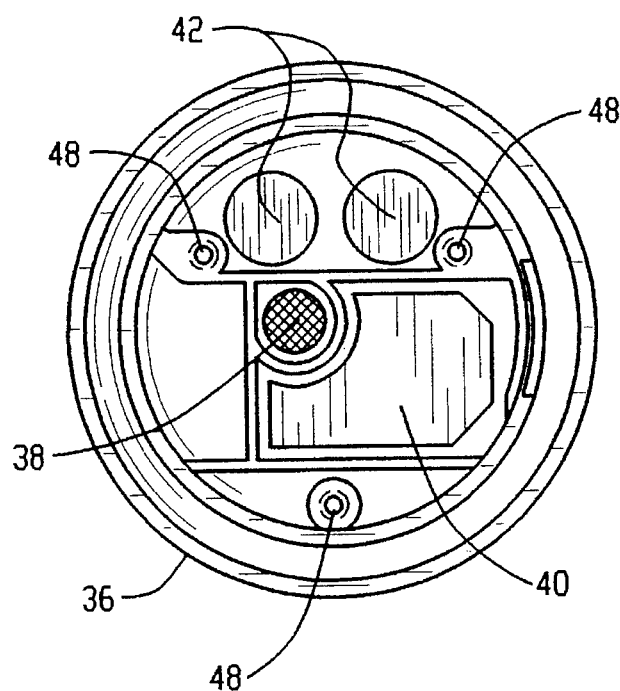
FIG. 3 is a bottom plan view of the transmitter of FIGS. 1A and 2 with its back cover removed.
Figure 4:
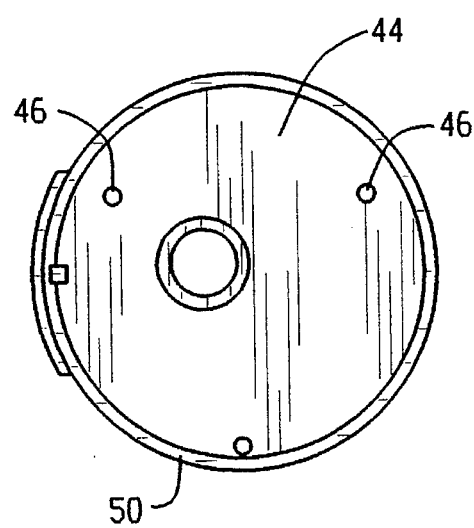
FIG. 4 is a bottom plan view of the back cover of the transmitter of FIG. 3.

The transmitter module housing 36 includes a back cover 44 which may be removed to access the transducer 38, the circuit board 40 and the batteries 42 (see FIGS. 3 and 4). The cover 44 is secured to the remainder of the housing 36 by means of screws (not shown) through holes 46 in the cover and corresponding threaded holes 48 in the housing. The back cover 44 is also provided with an annular ridge 50 which seats against the face mask extension 32 when the transmitter module 14 is installed in the face mask 12. A space 52 is thereby created between the back cover 42 and the airtight diaphragm 30, permitting the diaphragm to vibrate in response to the user's voice. Vibration of the diaphragm must be permitted for the diaphragm to allow the user's voice to pass therethrough to the transducer 38 in an audible fashion.

A magnetically actuatable reed switch 54 is contained within the housing 36 for switching the transmitter module on and off. A magnet (not shown) is mounted on the outside of the housing such that it is slidable with respect to the reed switch 54. By sliding the magnet back and forth, the reed switch may be selectively actuated and deactuated, thereby switching the transmitter module on and off. Of course, other types of switching mechanisms are contemplated by the present invention.

When the transmitter module 14 is turned on, the voice transmission system may operate in either a transmit mode or a receive mode. In the transmit mode, the transducer 38 picks up the user's voice after it passes through the diaphragm 30. Circuitry on the circuit board 40 processes this audio signal and in response broadcasts a short range radio signal in the ultra high frequency (UHF) radio range. In the preferred embodiment, the transmitter transmits the short range radio signal in the 1.0–2.4 gigahertz range. This frequency range is outside the range used by many commercially available radio communications products, such as one-way baby monitors and two-way walkie-talkies. Accordingly, broadcasting the short range radio signal in the gigahertz frequency range will eliminate interference with such devices. Further, short range radio signals in this range are more likely to penetrate structural components such as walls in environments in which the voice transmission system is likely to be used.

The receiver 16 receives the short range radio signal output by the transmitter module 14 and processes the signal by downconverting the signal from the ultra high frequency (UHF) radio range to the audio range. The receiver is provided with an amplifier/speaker assembly to amplify this resulting audio signal and provide local broadcast of the user's voice. The audio signal is also used as an input to the two-way radio 18 via the interconnect cable 20.

The two-way radio 18 may be one such as the transceiver 48 disclosed in U.S. Pat. No. 4,885,796 to Loftus, the text of which patent is hereby incorporated as if fully set forth herein. The two-way radio amplifies the audio input and transmits the amplified signal to a remotely located receiver by means of its antenna 22. The remotely located receiver amplifies the received signal, enabling the user to effectively communicate with the remote location.

In the receive mode of operation of the voice transmission system, a remotely located transmitter transmits a signal to the two-way radio 18 which picks up the signal on its antenna 22 and passes the signal on to the receiver 16 via the interconnect cable 20. The receiver amplifies the audio signal to provide local broadcast of the received communication.

The two-way radio 18 must be switched between the transmit and receive mode of operation. To accomplish this effect, a voice actuated switch is provided for the two-way radio. When the user speaks, the voice actuated switch is activated to switch the two-way radio into a transmit mode. In the absence of the user's voice, the voice actuated switch is deactivated, switching the two-way radio into the receive mode.

Figure 5A:
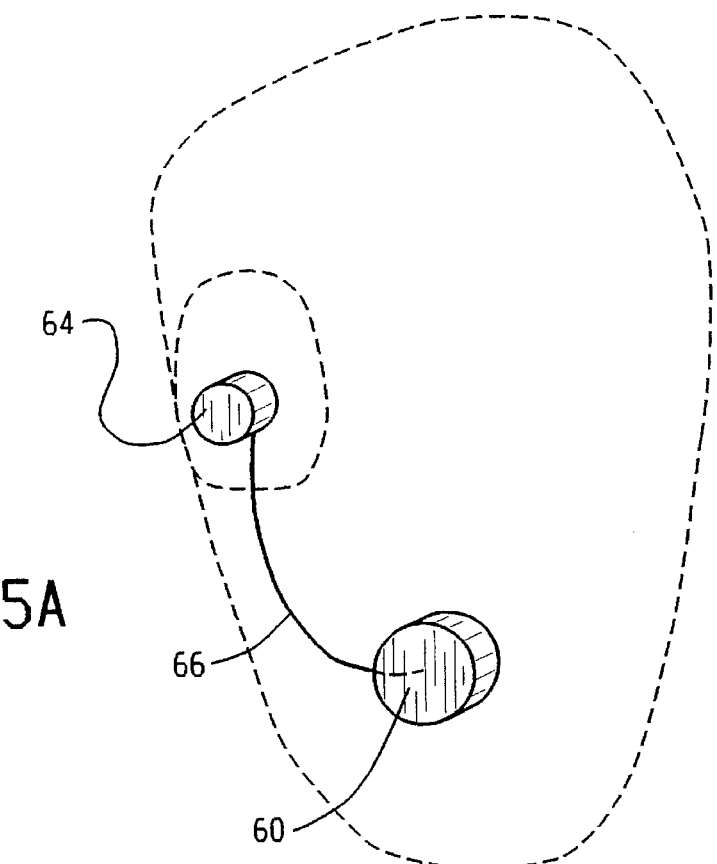
FIGS. 5A and 5B, taken together, are a perspective view of the individual components of a second embodiment of the wireless voice transmission system constructed according to the principles of the present invention.
Figure 5B:
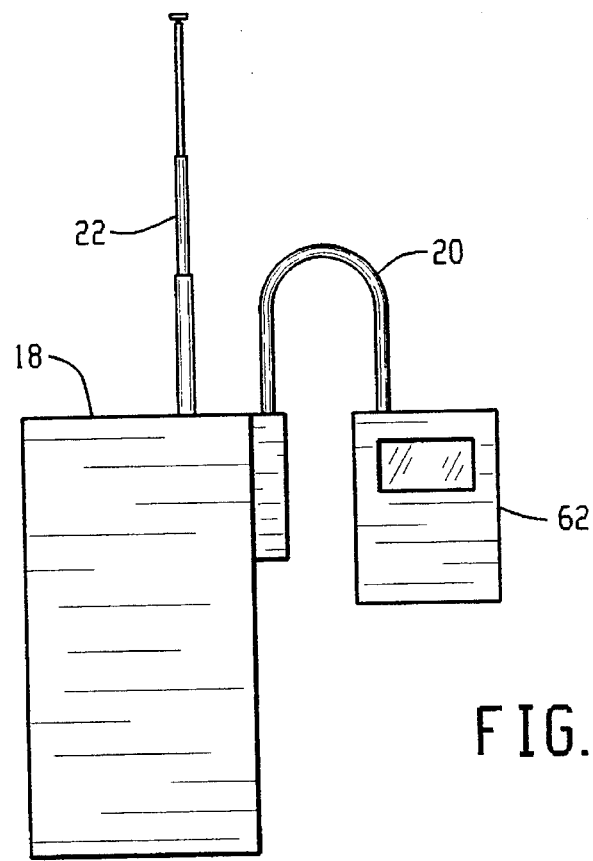

In the embodiment of the present invention described above, the operation between the transmitter module 14 and the receiver 16 is one-way from the transmitter to the receiver. In another embodiment of the invention, however, a system as shown in FIGS. 5A and 5B replaces the transmitter module 14 and the receiver 16 with short range first and second transceiver modules, 60 and 62, respectively. Such an arrangement permits independent communication between the first and second transceiver modules 60 and 62. An ear speaker 64 is connected to the first transceiver module 60 by means of a moveable boom 66. In this embodiment, the system may be used with or without a protective face mask.

Like the first embodiment described above (FIGS. 1A and 1B), this second embodiment (FIGS. 5A and 5B) operates in either a transmit mode or a receive mode. In the transmit mode, the first transceiver 60 picks up the user's voice, upconverts this audio signal to the ultra high frequency (UHF) radio range, and broadcasts the short range radio signal in much the same manner as the transmitter module 14 of the first embodiment. The second transceiver 62 operates like the receiver 16 in the first embodiment to receive the short range radio signal, process the signal by downconverting from the ultra high frequency (UHF) radio range to the audio range, and send the downconverted audio signal to the two-way radio 18 via the interconnect cable 20. Like the receiver 16, the second transceiver 62 may be provided with an amplifier/speaker assembly to amplify this resulting audio signal and provide local broadcast of the user's voice. The operation of the two-way radio 18 is the same as in the first embodiment.

In the receive mode of operation of the voice transmission system, a remotely located transmitter transmits a signal to the two-way radio 18 which picks up the signal on its antenna 22 and passes the signal on to the second transceiver 62 via the interconnect cable 20. The second transceiver 62 upconverts the received signal and transmits it to the first transceiver 60, now operating in the receive mode. The first transceiver amplifies the upconverted signal and broadcasts an amplified audio signal through the ear speaker 64.

The system may also be used in a local environment without the two-way radio 18. For example, if a group of two or more users of the system are to be located in the same local environment, only one user needs to be provided with the two-way radio 18 to provide long distance communication between the group and a remotely located command center. In this situation, the other members of the group may receive or transmit instructions to the remotely located command center via the one member provided with the two-way radio, and may communicate amongst themselves using their own transceiver pairs.

Accordingly, the preferred embodiments of a voice transmission system for use with or without a protective respirator have been described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter claimed.

What is claimed is:

1. A voice transmission system for a protective face mask provided with a voice diaphragm, comprising:

a voice transmitter module for transmitting the voice of a user of the face mask via a short range radio signal, said voice transmitter module at least partially enclosing a microphone and removably attachable to an external portion of the face mask opposite the voice diaphragm such that said microphone is fixedly positioned proximate the user's mouth;

a first radio receiver remotely located from said voice transmitter module for receiving said short range radio signal output by said voice transmitter module, processing said short range radio signal, and outputting an audio output signal; and a transceiver for (i) receiving said audio output signal from said first radio receiver, amplifying said audio output signal, and transmitting said amplified audio output signal to a remotely located second receiver, in a transmitting mode, and for (ii) receiving a broadcast signal from a remotely located transmitter, in a receiving mode.

2. The voice transmission system of claim 1, further comprising a switch for switching the transceiver between receiving and transmitting modes.

3. The voice transmission system of claim 2, wherein said switch is voice actuated, switching the transceiver into transmitting mode when detecting the user's voice and switching the transceiver into receiving mode when not detecting the user's voice.

4. The voice transmission system of claim 2, further comprising a magnetically actuatable reed switch contained within the voice transmitter module and a magnet mounted to the outside of the module and slidable with respect to said reed switch.

5. The voice transmission system of claim 2, wherein said transmitter module transmits said short range radio signal in the ultra high frequency (UHF) radio range.

6. The voice transmission system of claim 5, wherein said voice transmitter module transmits said short range radio signal in the 1.0–2.4 gigahertz range.

7. The voice transmission system of claim 5, wherein said first receiver downconverts said short range radio signal from the ultra high frequency (UHF) radio range to the audio frequency range.

8. The voice transmission system of claim 1, further providing local voice amplification in the form of a speaker driven by said first radio receiver.

9. A communications system, comprising:

a protective face mask sealable against the face of a user and provided with a voice diaphragm;

a voice transmitter module for transmitting the voice of a user of said face mask via a short range radio signal, said voice transmitter module at least partially enclosing a microphone and removably attachable to an external portion of the face mask opposite the voice diaphragm such that said microphone is fixedly positioned proximate the user's mouth;

a first radio receiver remotely located from said voice transmitter module for receiving said short range radio signal output by said voice transmitter module, processing said short range radio signal, and outputting an audio output signal; and a transceiver for (i) receiving said audio output signal from said first radio receiver, amplifying said audio output signal, and transmitting said amplified audio output signal to a remotely located second receiver, in a transmitting mode, and for (ii) receiving a broadcast signal from a remotely located transmitter, in a receiving mode.

10. The communications system of claim 9, further comprising a switch for switching the transceiver between receiving and transmitting modes.

11. The communications system of claim 10, wherein said switch is voice actuated, switching the transceiver into transmitting mode when detecting the user's voice and switching the transceiver into receiving mode when not detecting the user's voice.

12. The communications system of claim 10, further comprising a magnetically actuatable reed switch contained within the voice transmitter module and a magnet mounted to the outside of the module and slidable with respect to said reed switch.

13. The communications system of claim 10, wherein said transmitter module transmits said short range radio signal in the ultra high frequency (UHF) radio range.

14. The communications system of claim 13, wherein said voice transmitter module transmits said short range radio signal in the 1.0–2.4 gigahertz range.

15. The communications system of claim 13, wherein said first receiver downconverts said short range radio signal from the ultra high frequency (UHF) radio range to the audio frequency range.

16. The communications system of claim 9, further providing local voice amplification in the form of a speaker driven by said first radio receiver.

* * * * *